United States Patent
Yoon

(10) Patent No.: US 10,336,175 B2
(45) Date of Patent: Jul. 2, 2019

(54) ENGINE MOUNT FOR VEHICLE

(71) Applicant: Hyundai Motor Company, Seoul (KR)

(72) Inventor: Hyoung Jin Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/277,201

(22) Filed: Sep. 27, 2016

(65) Prior Publication Data

US 2017/0313171 A1     Nov. 2, 2017

(30) Foreign Application Priority Data

Apr. 29, 2016   (KR) .......................... 10-2016-0052681

(51) Int. Cl.
   B60K 5/12     (2006.01)
   F16F 13/08    (2006.01)
   F16F 13/26    (2006.01)

(52) U.S. Cl.
   CPC .......... B60K 5/1283 (2013.01); B60K 5/1208 (2013.01); F16F 13/08 (2013.01); F16F 13/26 (2013.01)

(58) Field of Classification Search
   CPC ........ F16F 13/08; F16F 13/26; B60K 5/1208; B60K 5/1283
   See application file for complete search history.

(56) References Cited

U.S. PATENT DOCUMENTS

| 5,388,812 | A  | * | 2/1995 | Kojima | .................. | F16F 13/18 |
|---|---|---|---|---|---|---|
|  |  |  |  |  |  | 267/140.13 |
| 2012/0242021 | A1 | * | 9/2012 | Koyama | ............... | F16F 13/103 |
|  |  |  |  |  |  | 267/140.14 |
| 2013/0001842 | A1 | * | 1/2013 | Kanaya | ................. | F16F 13/106 |
|  |  |  |  |  |  | 267/140.13 |
| 2013/0001843 | A1 | * | 1/2013 | Kanaya | ................. | F16F 13/106 |
|  |  |  |  |  |  | 267/140.14 |

(Continued)

FOREIGN PATENT DOCUMENTS

| JP | H05-272574 | A | 10/1993 |
|---|---|---|---|
| JP | 2004-278661 | A | 10/2004 |
| JP | 2008-157411 | A | 7/2008 |

(Continued)

OTHER PUBLICATIONS

English Machine Translation of JP-5272574 and JP-2004278661.*
English translation of JP-2008157411 (Year: 2008).*

*Primary Examiner* — Melody M Burch
(74) *Attorney, Agent, or Firm* — Mintz Levin Cohn Ferris Glovsky and Popeo, P.C.; Peter F. Corless

(57) ABSTRACT

A semi-active engine mount for a vehicle is provided to improve the NVH performance and ride quality. An engine mount for a vehicle includes a rubber module with a rubber having a core therein, and a case that surrounds an exterior circumference of the rubber and a fluid module with a module case coupled to the rubber module to define an upper and lower chamber and having straight and a bypass flow paths, a closure configured to open or close the straight flow (Continued)

path, and a diaphragm installed on the module case to close the lower chamber. A coil module has a coil embedded in the fluid module and configured to open and close the closure when a power source is turned on or off. In particular, a high loss factor when the vehicle travels is reduced, and decreasing dynamic characteristics when the vehicle idles is decreased.

9 Claims, 3 Drawing Sheets

(56) References Cited

U.S. PATENT DOCUMENTS

| 2013/0256960 A1* | 10/2013 | Marienfeld | F16F 13/10 |
| | | | 267/140.14 |
| 2014/0218023 A1* | 8/2014 | Fordham | G01F 1/716 |
| | | | 324/306 |

FOREIGN PATENT DOCUMENTS

| JP | 2008-163974 A | 7/2008 |
| JP | 2009-264499 A | 11/2009 |
| KR | 10-2009-0108956 A | 10/2009 |
| KR | 10-2013-0003749 A | 1/2013 |
| KR | 10-2016-0013609 A | 2/2016 |

* cited by examiner

ENGINE MOUNT FOR VEHICLE

CROSS-REFERENCE TO RELATED APPLICATION

This application claims under 35 U.S.C. § 119(a) the benefit of Korean Patent Application No. 10-2016-0052681 filed on Apr. 29, 2016, the entire contents of which are incorporated herein by reference.

BACKGROUND (a) Technical Field

The present disclosure relates to an engine mount for a vehicle and more particularly, to a semi-active engine mount for a vehicle capable of improving noise, vibration, and harshness (NVH) performance and ride quality by decreasing dynamic characteristics of the mount when the vehicle idles and increasing a loss factor during the driving operation of the vehicle.

(b) Background Art

Generally, an engine mount prevents vibration of an engine from being transmitted to a vehicle body, insulates a vibration mode of a vehicle and control motion of the engine. The engine mount minimizes motion of the engine by making the engine mount hard statically and insulates the high-frequency vibration by making the engine mount soft dynamically.

Usually, the engine mount formed from a rubber material has a drawback of being vulnerable to low-frequency and large-displacement vibration. Accordingly, the engine mount cannot sufficiently satisfy both high-frequency and low-amplitude vibration and low-frequency and large-displacement vibration. Therefore, a fluid engine mount has been used which may absorb and attenuate vibration over a widespread region that includes the high-frequency and low-amplitude vibration and the low-frequency and large-displacement vibration input to the engine mount when the engine operates.

Recently, improved noise reducing properties of a vehicle for a driver and improved NVH performance associated with a noise problem has been required. In particular, engine mounts with various control methods have been developed. For example, a hydraulic mount, a semi-active mount, and the like, which prevent deterioration in NVH performance of a variable cylinder engine have been developed to improve fuel economy of the vehicle.

Further, to improve NVH performance, insulation performance is increased by decreasing the dynamic characteristics of the mount when the vehicle idles and to improve ride quality by increasing a loss factor during the driving operation of the vehicle. However, due to of the nature of the current hydraulic mount, a loss factor tends to decrease when dynamic characteristics decrease and the dynamic characteristics tend to increase when the loss factor increases. Accordingly, the loss factor and the dynamic characteristics conflict with each other.

A semi-active mount (switchable mount) has been developed. In particular, the semi-active mount decreases dynamic characteristics when the vehicle idles and increases a loss factor during the driving operation of the vehicle. Accordingly, the semi-active mount is widely and progressively applied to many vehicles. However, when the current semi-active mount, a coil having high capacity that corresponds to rigidity of a rubber spring needs to be applied, costs and weights are greatly increased due to a number of components being required and a structure thereof is being complex. The current semi-active mount is disadvantageous in terms of packaging due to a size greater than that of the existing hydraulic mount.

The above information disclosed in this section is merely for enhancement of understanding of the background of the invention and therefore it may contain information that does not form the prior art that is already known in this country to a person of ordinary skill in the art.

SUMMARY

The present provides a semi-active engine mount for a vehicle to improve NVH performance and ride quality by decreasing dynamic characteristics when the vehicle idles and increasing a loss factor during the driving operation of the vehicle.

For example, a high loss factor may be obtained when the vehicle travels, decreasing dynamic characteristics when the vehicle idles, and thus improves both driving vibration and idling vibration. Further, an increase in costs and weight may be minimized due to the reduction of the number of components and simplified structure. In addition, packaging size may be simplified because a size thereof is equal to a size of the existing hydraulic mount.

In one aspect, the present invention provides an engine mount for a vehicle that may include a rubber module which includes a rubber having a core therein, and a case that surrounds an exterior circumference of the rubber, a fluid module which includes a module case coupled to the rubber module to define an upper chamber and a lower chamber and having a straight flow path and a bypass flow path, a closure configured to open or close the substantially straight flow path, and a diaphragm disposed on the module case that may be configured to close the lower chamber; and a coil module with a coil embedded in the fluid module and configured to adjust the position (e.g., open or close) of the closure as a power source is turned on or off.

In an exemplary embodiment, a permanent magnet may be embedded in the closure of the fluid module. In another exemplary embodiment, the closure may include a circular plate portion with an embedded permanent magnet and configured to open or close the straight flow path; and a connecting rod that vertically extends from the circular plate portion and may be coupled to the diaphragm after passing through the straight flow path.

In still another exemplary embodiment, the straight flow path formed in the module case of the fluid module may be formed as a pipe made of a material to which the permanent magnet embedded in the closure may be coupled by magnetic force. In yet another exemplary embodiment, the pipe may be a steel pipe. Further, a direction of poles of the permanent magnet and a direction of poles of the coil may be set to generate a repulsive force between the same poles of the permanent magnet and the coil by a magnetic field may be generated in the coil when a power source is turned on. The straight flow path formed in the module case of the fluid module may be formed as a steel pipe. The coil of the coil module may be embedded coaxially with the module case.

The engine mount for a vehicle provided by the present invention has the following advantages.

First, NVH performance may be improved by improving insulation performance by decreasing dynamic characteristics of the mount when the vehicle idles, and ride quality may be improved by increasing a loss factor during a driving operation of the vehicle.

Second, the number of components may be minimized and a structure may be simplified to reduce the costs and weights reduced.

Third, the engine mount may have the same size as the existing hydraulic mount.

Accordingly, the engine mount may be advantageous in terms of packaging and may be compatible with the existing hydraulic mount to be mounted in a vehicle.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
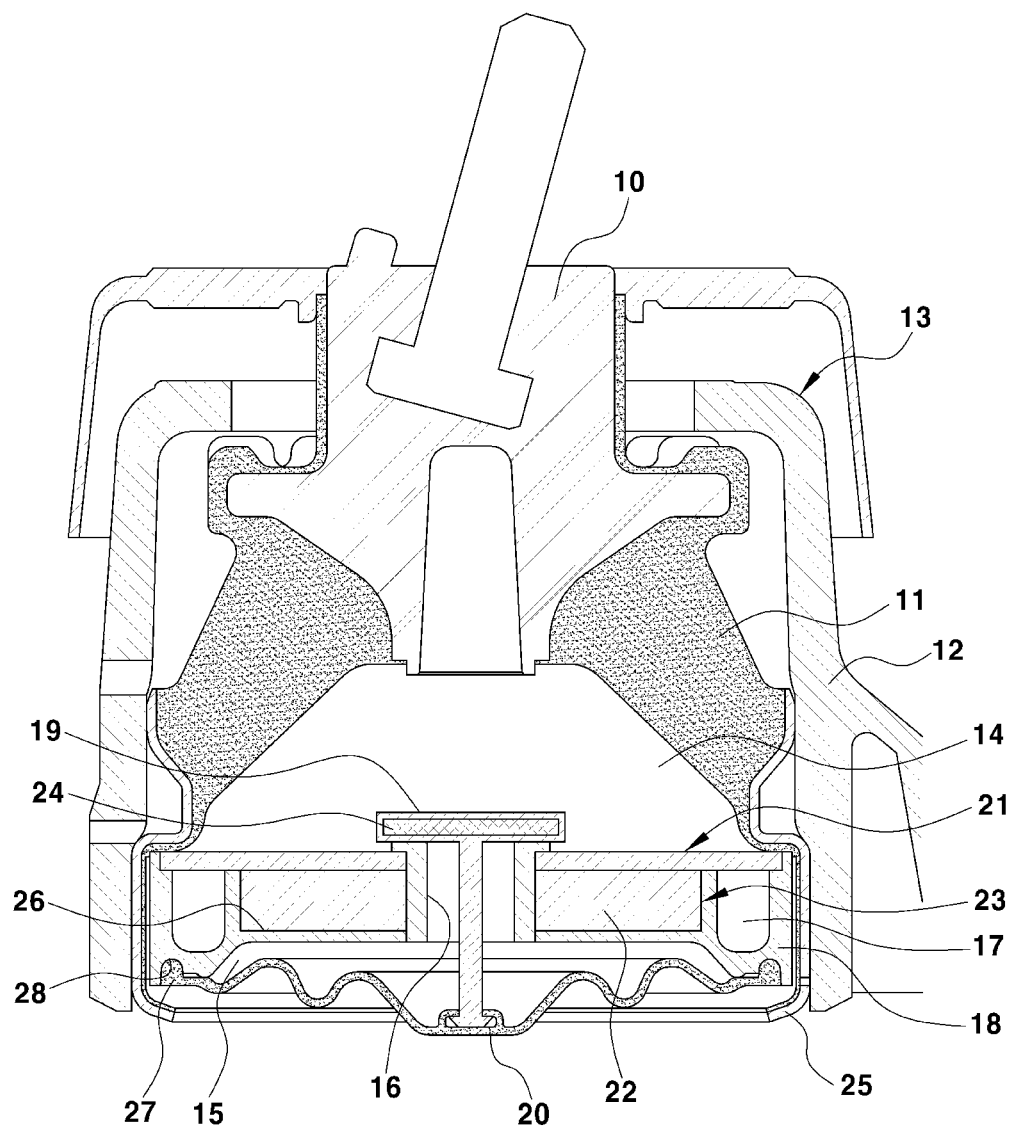
FIG. 1 is an exemplary cross-sectional view illustrating an engine mount for a vehicle according to an exemplary embodiment of the present invention.

Reference numerals set forth in the Drawings includes reference to the following elements as further discussed below:

10: core
11: rubber
12: case
13: rubber module
14: upper chamber
15: lower chamber
16: straight flow path
17: bypass flow path
18: module case
19: closure
20: diaphragm
21: fluid module
22: coil
23: coil module
24: permanent magnet
25: steel housing
26: coil seating groove
27: protrusion
28: groove It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present invention will be described in detail with reference to the accompanying drawings.

FIG. 1 is an exemplary cross-sectional view illustrating an engine mount for a vehicle according to an exemplary embodiment of the present invention. As illustrated in FIG. 1, the engine mount for a vehicle may have a structure that optimizes vibration characteristics by adjusting dynamic characteristics of the mount and a loss factor when the vehicle travels and when the vehicle idles. In particular, the engine mount for a vehicle according to the exemplary embodiment of the present invention may include a combination of a rubber module 13, a fluid module 21, and a core module 23 and the respective modules may be integrally assembled by rubber vulcanization, bolting, welding, or the like.

In other words, the engine mount for a vehicle according to the exemplary embodiment of the present invention may include the rubber module 13 which includes a rubber 11 having a core 10 therein and a case 12 that surrounds an exterior circumference of the rubber 11, the fluid module 21 which includes a module case 18 coupled to the rubber module 13 to define an upper chamber 14 and a lower chamber 15 and has a straight flow path 16 and a bypass flow path 17, a closure 19 configured to open or close the straight flow path 16 a diaphragm 20 disposed on the module case 18 and configured to close the lower chamber 15 and the coil module 23 which has a coil 22 embedded in the fluid module 21 and configured to open or close the closure 19 when a power source is turned on or off.

Hereinafter, the respective configurations will be described in more detail. The rubber module 13 may include the core 10 coupled to an engine and the rubber 11 may be integrally formed around the core 10. The approximately cylindrical case 12 coupled to a vehicle body may be integrally coupled to an exterior circumference of the rubber 11. The rubber module 13 may include a steel housing 25 and the steel housing 25 may have a container shape (e.g., a spherical or rectangular shape or the like). The steel housing 25 may be coupled by being inserted at a lower end in the case 12 and coupled to the rubber 11 to provide protection to the diaphragm 20 and the like positioned therein. The rubber module 13 may reduce vibration transmitted from the engine using dynamic characteristics exhibited by the rubber 11.

The fluid module 21 may include the module case 18, the closure 19, and the diaphragm 20. The module case 18 may be formed from an aluminum or plastic material (e.g., or the like) and may have a circular plate shape of a predetermined thickness. The straight flow path 16 that vertically penetrates the plate shape may be formed in a central region of the module case 18.

The bypass flow path 17 may be formed along an edge region of the module case 18. The module case 18 may be disposed at a lower end portion in the rubber module 13, for example, on a bottom portion in the steel housing 25 coupled to the lower end in the case 12, and may be installed to be fixed by being fitted with a circumference of an interior wall of the steel housing 25 (e.g., the interior circumferential surface of the rubber member formed on the inner wall of the steel housing). Since the module case 18 may be installed as described above, an upper portion of a cavity formed to be surrounded between a bottom of the rubber 11 and an inner side of the steel housing 25 may be defined as the upper chamber 14, and a lower portion of the cavity may be defined as the lower chamber 15 that may be closed by the diaphragm 20.

In particular, a bottom of the steel housing 25 may be opened preventing interference with the motion of the diaphragm 20. A coil seating groove 26 for installing the coil 22 may be formed in a region of the module case 18 between a central portion where the straight flow path 16 may be positioned and an exterior peripheral portion where the bypass flow path 17 may be positioned. Further, the coil 22 of the coil module 23 may be inserted and installed into the coil seating groove 26. In other words, the coil 22 installed in the coil seating groove 26 may have a shape that surrounds the straight flow path 16 at the central portion.

Further, an orifice (not illustrated) in fluid communication with the upper chamber 14 above the module case 18 and an orifice (not illustrated) in fluid communication with the lower chamber 15 below the module case 18 may be formed in the bypass flow path 17 of the module case 18. In other words, the upper and lower orifices may be positioned at a predetermined distance, for example, at a distance with a phase difference of about 270° in a circumferential direction, and a partition wall (not illustrated) may be formed at one side in the flow path. Therefore, a fluid in the upper chamber 14, which inflows through the upper orifice, may flow to the lower chamber 15 through the lower orifice via the bypass flow path 17 having a circumferential path of about 270°. Additionally, a fluid in the lower chamber 15, which inflows through the lower orifice, may flow to the upper chamber 14 through the upper orifice via the bypass flow path 17 along the same path.

In particular, a pipe may be mounted in the straight flow path 16 formed in the module case 18 of the fluid module 21. Namely, the pipe may be the straight flow path 16 itself. For example, the pipe may be a pipe formed from a material to attached a permanent magnet 24 embedded in the closure 19 by magnetic force, and particularly, the pipe may be a steel pipe. The steel pipe may be mounted and coupled by being fitted, in vertical direction, into an aperture at the central portion for the straight flow path 16, and may be fixed at the periphery of an upper end of the aperture by a flange at the upper end of the pipe.

The closure 19 may be configured to open or close the straight flow path 16. A structure with a circular plate portion having an embedded permanent magnet 24 to be described below configured to open or close the straight flow path 16 may be integrally formed with a connecting rod that extends vertically in a downward direction from a center of a bottom of the circular plate portion.

The upper circular plate portion of the closure 19 may be positioned to block an upper end opening of the straight flow path 16 formed as a steel pipe and may open and close the straight flow path 16. A lower end portion of the connecting rod may be connected to a central portion of the diaphragm 20 when the connecting rod penetrates the straight flow path 16 and extends along an axis of the straight flow path 16 to the lower chamber 15 at a lower side.

In particular, the plate-shaped permanent magnet 24 may be embedded in the circular plate portion of the closure 19 of the fluid module 21. A direction of poles of the permanent magnet 24 may set to set an S-pole at an upper side and set an N-pole at a lower side. This is just one example, and the present invention is not limited thereto and the N-pole may be set at the upper side of the permanent magnet 24, and the S-pole may be set at the lower side thereof. However, the direction of the poles of the permanent magnet 24 and a direction of poles of the coil 22 to be described below may configured to generate repulsive force (e.g., pushing force) between the same poles of the permanent magnet 24 and the coil 22 when electric power is applied to the coil 22 and a magnetic field is generated.

Therefore, because of the repulsive force, the closure may be adjusted and may be configured to open the straight flow path as described below. Namely, when an external force is not applied (e.g., no magnetic field is formed by the coil), the closure 19 covers the straight flow path 16 by being attached to the steel pipe of the straight flow path 16 by magnetic force of the permanent magnet 24. Accordingly, the closure 19 blocks the straight flow path 16.

The diaphragm 20 may be horizontally disposed to be parallel with the bottom of the module case 18 and may be installed by a structure with a protrusion 27 formed along an edge of the diaphragm 20 inserted into a groove 28 formed along an edge of the bottom of the module case 18. Since the diaphragm 20 may be installed at the bottom of the module case 18 as described above, the lower chamber 15 may be formed in a cavity surrounded by the bottom of the module case 18 and an interior surface of the diaphragm 20. The lower end portion of the connecting rod of the closure 19 may be coupled to a central portion of the interior surface of the diaphragm 20. Since the connecting rod may be coupled to the diaphragm 20 as described above, the diaphragm 20 may fix the position of the closure 19 to prevent the closure 19 from floating in a liquid in the upper chamber 14.

The coil module 23 may be configured to generate a magnetic field as a power source that may be turned on or off to adjust the position of the closure 19 of the fluid module 21. The coil module 23 may include the coil 22 disposed in the coil seating groove 26 formed in the module case 18 of the fluid module 21. For example, when electric power is applied to the coil 22 from the exterior, the coil 22 may be configured to generate a magnetic field and the coil 22 may be embedded coaxially with the module case 18.

A method of connecting external electric wires to apply electric power to the coil may be adopted without particular limitation as long as the method is typically known in the art (e.g., a aperture may be drilled in the case, the steel housing, or the module case, and wiring may be inserted through the aperture and connected to the coil). Therefore, an operational state of the engine mount for a vehicle configured as described above will be described below.

Figure 2:
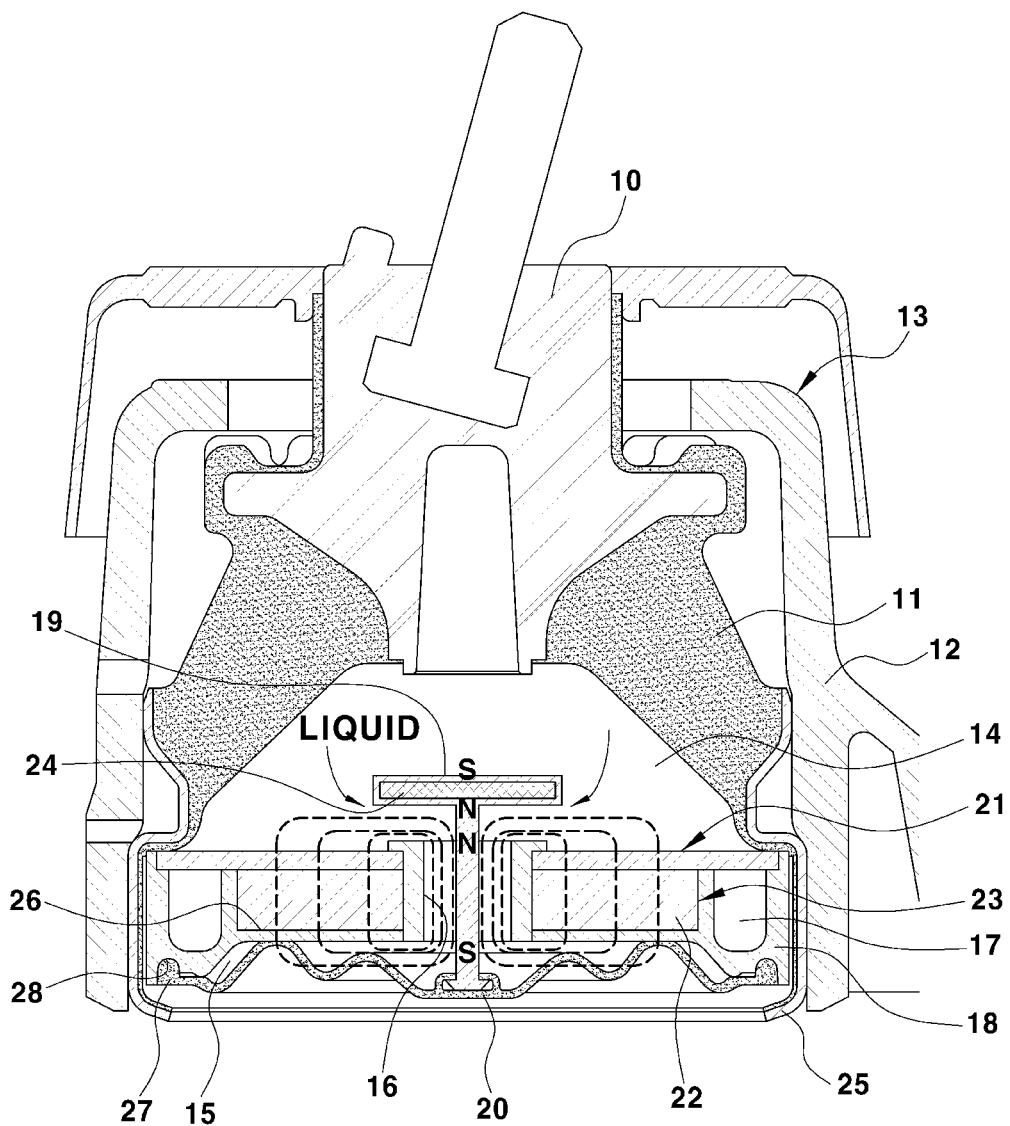
FIG. 2 is an exemplary cross-sectional view illustrating a state in which the engine mount for a vehicle according to the exemplary embodiment of the present invention is operated when the vehicle idles.

FIG. 2 is an exemplary cross-sectional view illustrating a state in which the engine mount for a vehicle according to the exemplary embodiment of the present invention is operated when the vehicle idles. As illustrated in FIG. 2, when the S-pole is set at the upper side and the N-pole is set at the lower side in the permanent magnet 24 of the closure 19 that blocks the straight flow path 16 of the fluid module 21, electric current may be applied to the coil 22 of the coil module 23 to generate a magnetic field at the periphery of the straight flow path 16 with the N-pole disposed at the upper side and the S-pole disposed at the lower side.

In particular, the magnetic field generated by the coil 22 may draw out the permanent magnet 24. Accordingly, the closure 19 may be configured to open the straight flow path 16. Therefore, the liquid may flow between the upper chamber 14 and the lower chamber 15 through the straight flow path 16, thereby decreasing dynamic characteristics. In other words, the closure 19 may remain supported by the diaphragm 20 and may continue to open the straight flow path 16.

Figure 3:
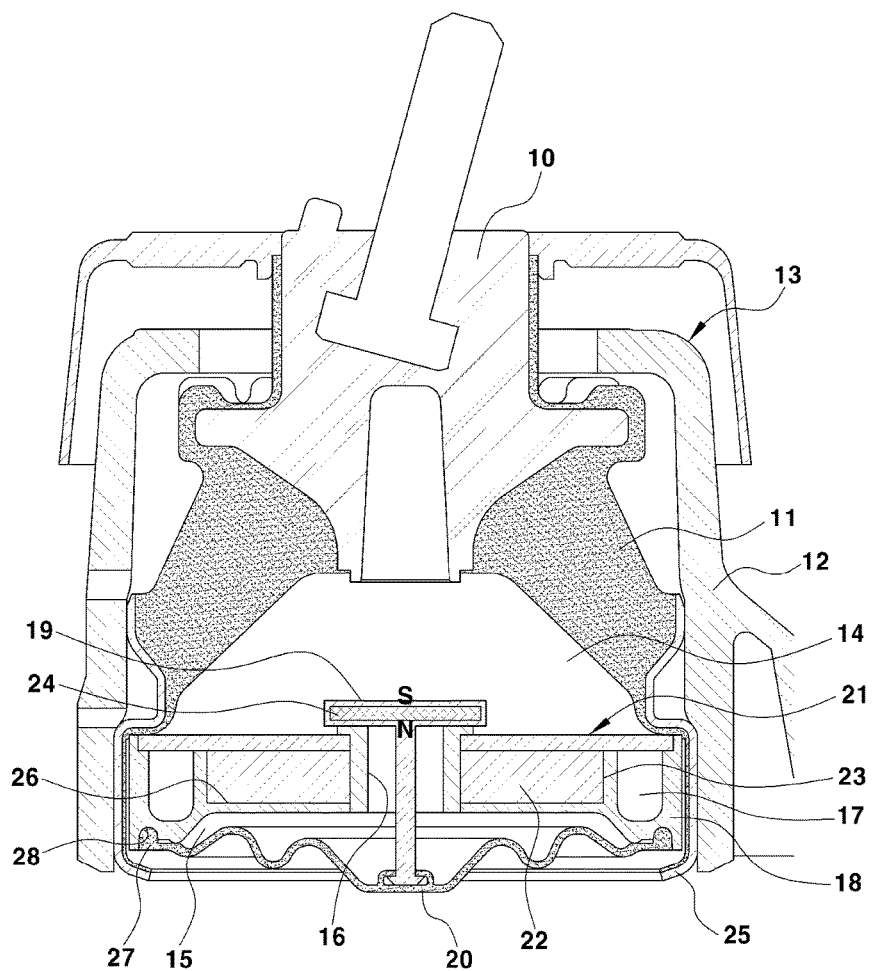
FIG. 3 is an exemplary cross-sectional view illustrating a state in which the engine mount for a vehicle according to the exemplary embodiment of the present invention is operated when the vehicle travels.

FIG. 3 is an exemplary cross-sectional view illustrating a state in which the engine mount for a vehicle according to the exemplary embodiment of the present invention during the driving operation of the vehicle. As illustrated in FIG. 3, when the supply of electric current to the coil 22 is turned off during driving of the vehicle, the magnetic field disappears at the periphery of the straight flow path 16. The closure 19 having the permanent magnet 24 therein may be attached to the upper end of the straight flow path 16 formed as a steel pipe to block the flow path. For example, when the closure 19 is positioned by being supported on the central portion of the diaphragm 20, the closure 19 may be configured to close the straight flow path 16. Since the straight flow path 16 is blocked as described above, the liquid may flow between the upper chamber 14 and the lower chamber 15 through the bypass flow path 17, thereby increasing a loss factor.

As described above, the semi-active engine mount provided by the present invention may decrease dynamic characteristics when the vehicle idles and increase a loss factor when the vehicle drives. The dynamic characteristics of the mount and the loss factor may be appropriately adjusted in accordance with a situation for each traveling condition. In particular, since the semi-active engine mount has a similar size as the existing hydraulic mount, similar packaging may be used. Further, the semi-active engine mount may be compatible with the existing hydraulic mount and thus may be mounted. The costs and weight may be minimized due to a simplified structure.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An engine mount for a vehicle, comprising:
   a rubber module which includes a rubber having a core therein, and a case that surrounds an exterior circumference of the rubber;
   a fluid module with a module case coupled to the rubber module to define an upper chamber and a lower chamber and having a straight flow path and a bypass flow path, a closure configured to open or close the straight flow path, and a diaphragm installed on the module case to close the lower chamber; and
   a coil module which has a coil embedded in the fluid module and configured to open and close the closure when a power source is turned on or off,
   wherein the module case has a circular plate shape of a predetermined thickness, and the straight flow path that vertically penetrates the circular plate shape is formed in a central region of the module case such that a liquid flows directly between the upper chamber and the lower chamber through the straight flow path, and
   wherein the closure includes:
   a circular plate portion in which a permanent magnet is embedded and configured to open or close the straight flow path; and
   a connecting rod that is integrally formed with the circular plate portion and vertically extends from the circular plate portion and a lower end portion of the connecting rod is connected to a central portion of the diaphragm after passing through the straight flow path.

2. The engine mount of claim 1, wherein the permanent magnet is embedded in the closure of the fluid module.

3. The engine mount of claim 2, wherein the straight flow path formed in the module case of the fluid module is formed as a pipe made of a material to which the permanent magnet embedded in the closure is coupled by magnetic force.

4. The engine mount of claim 3, wherein the pipe is a steel pipe.

5. The engine mount of claim 2, wherein a direction of poles of the permanent magnet and a direction of poles of the coil are configured to generate a repulsive force between the same poles of the permanent magnet and the coil by a magnetic field generated in the coil when a power source is turned on.

6. The engine mount of claim 1, wherein the straight flow path formed in the module case of the fluid module is formed as a steel pipe.

7. The engine mount of claim 1, wherein the coil of the coil module is embedded coaxially with the module case.

8. An engine mount for a vehicle, comprising:
- a rubber module which includes a rubber having a core therein, and a case that surrounds an exterior circumference of the rubber;
- a fluid module with a module case coupled to the rubber module to define an upper chamber and a lower chamber and having a straight flow path and a bypass flow path, a closure configured to open or close the straight flow path, and a diaphragm installed on the module case to close the lower chamber; and
- a coil module which has a coil embedded in the fluid module and configured to open and close the closure when a power source is turned on or off,
- wherein the module case has a circular plate shape of a predetermined thickness, the straight flow path that vertically penetrates the plate shape is formed in a central region of the module case such that a liquid flows directly between the upper chamber and the lower chamber through the straight flow path,
- wherein an upper circular plate portion of the closure is positioned to block an upper end opening of the straight flow path formed as a steel pipe and is configured to open and close the straight flow path, and
- wherein the closure includes:
    - a circular plate portion in which a permanent magnet is embedded and configured to open or close the straight flow path; and
    - a connecting rod that is integrally formed with the circular plate portion and vertically extends from the circular plate portion and a lower end portion of the connecting rod is connected to a central portion of the diaphragm after passing through the straight flow path.

9. The engine mount of claim 1, wherein the coil is formed in a region of the module case between a central portion where the straight flow path is positioned and an exterior peripheral portion where the bypass flow path is positioned.

* * * * *